Dec. 22, 1953            L. A. EDERER            2,663,117
FISH TRAPPING APPARATUS
Filed Aug. 29, 1950                               2 Sheets—Sheet 1
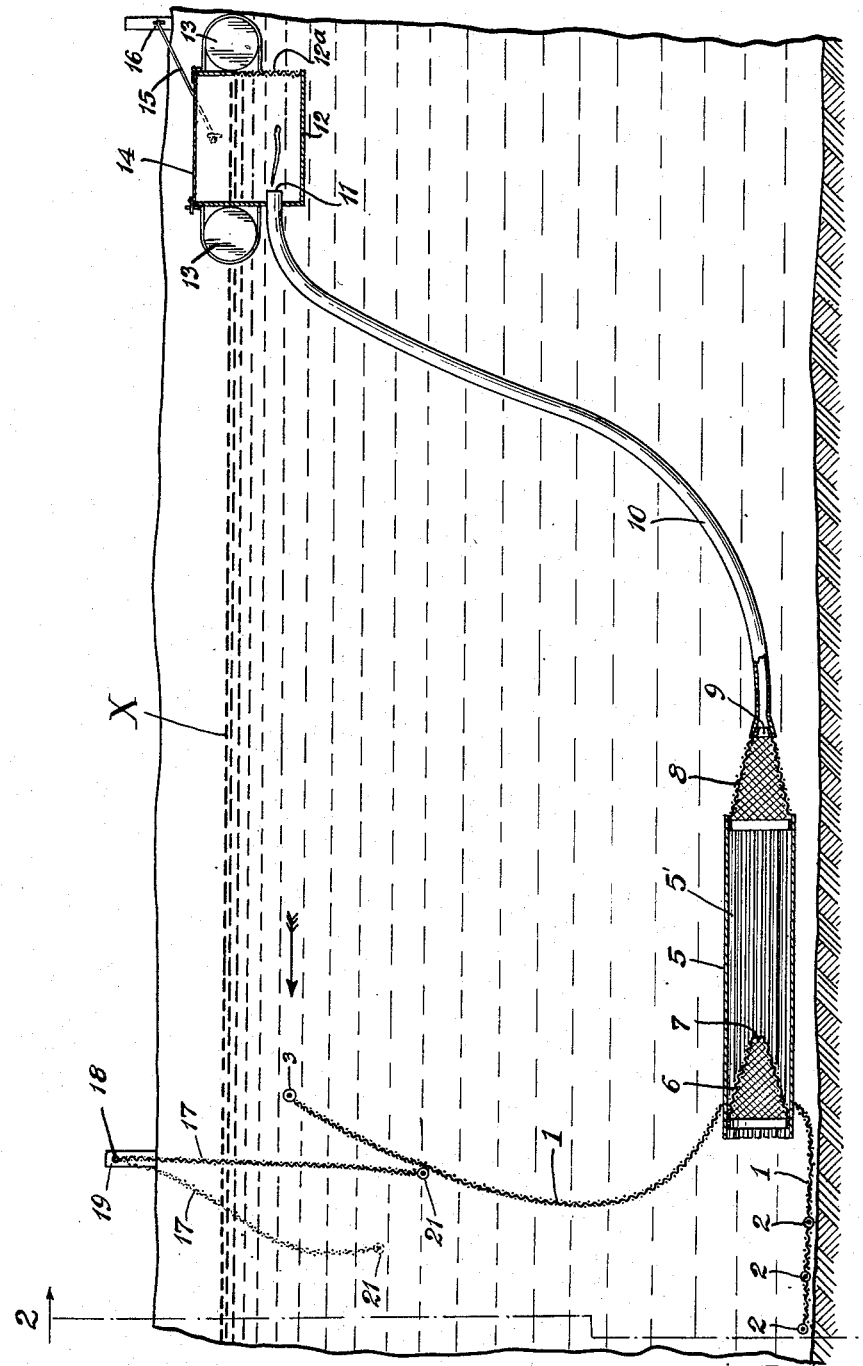
Inventor
Lothar A. Ederer
by Parker & Carter
Attorneys

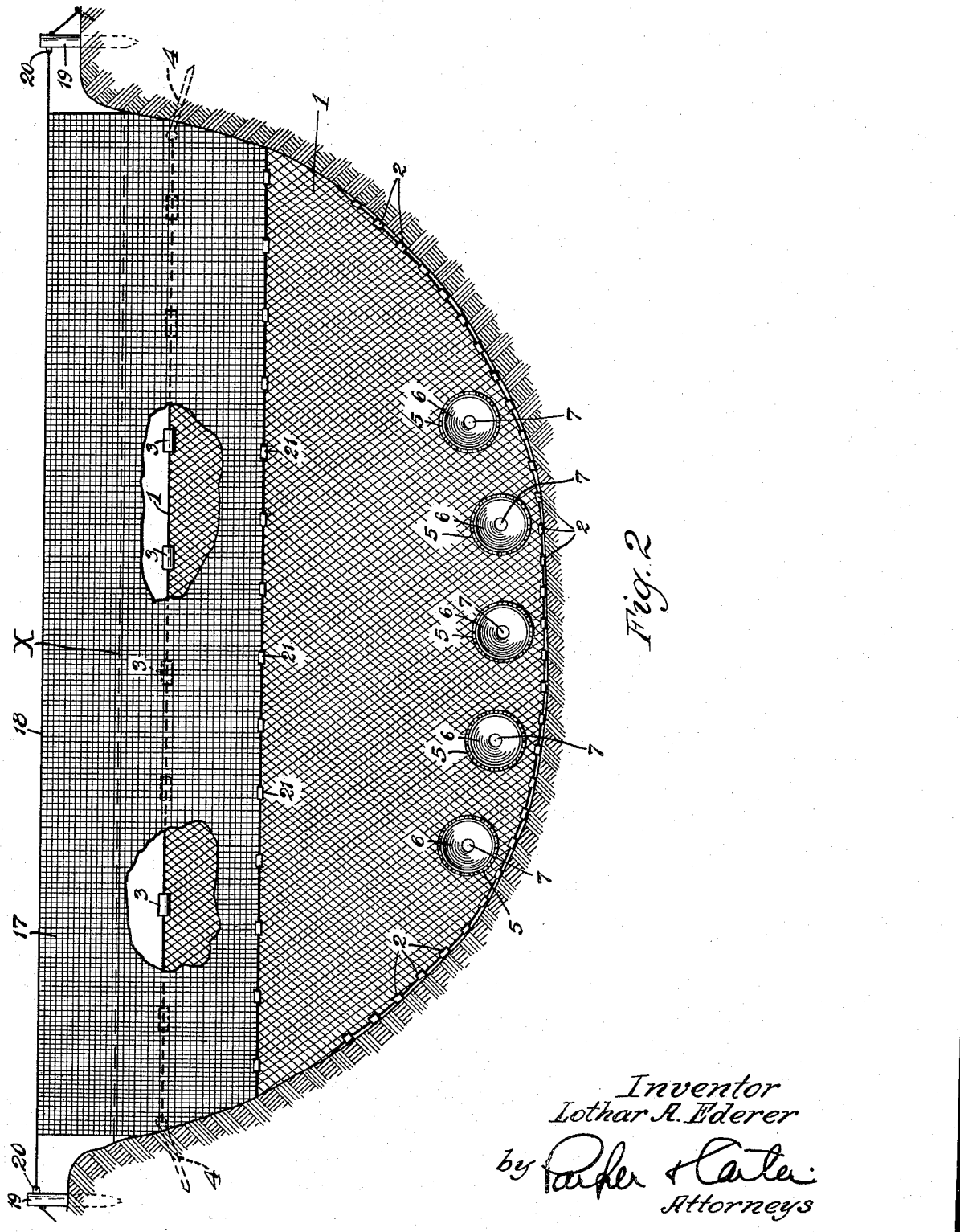

Patented Dec. 22, 1953

2,663,117

UNITED STATES PATENT OFFICE 2,663,117

FISH TRAPPING APPARATUS

Lothar A. Ederer, Chicago, Ill., assignor to Keal Products, Inc., Evanston, Ill., a corporation of Illinois Application August 29, 1950, Serial No. 182,044

8 Claims. (Cl. 43—100)

This invention relates to an apparatus for trapping eels, sea lampreys, fish and other marine life.

It has for one object to provide a simple and durable mechanism for trapping such creatures as move in the waters of streams.

It has for another object to provide means of safeguarding a trap installation to prevent the escape of fish, eels, sea lampreys and the like, and to permit the movement of floating objects of substantial size, without damage to the nets.

Another object is to provide a construction and an assembly, including a net and one or more fish or lamprey traps, so arranged that the assembly as a whole is safeguarded from danger due to floating objects, such as logs, brush and the like.

Other objects will appear from time to time throughout the specification and claims.

The invention is illustrated more or less diagrammatically in the accompanying drawing, wherein:

Figure 1 is a diagrammatic vertical section illustrating one form of the device;

Figure 2 is a transverse vertical view taken at line 2—2 of Figure 1; and showing the earth in section and the net structure in elevation.

Like parts are indicated by like characters in the specification and drawings.

The device is shown generally in the figures as being positioned in a water course or channel. Frequently it will be positioned in a river or other stream. Its purpose is to provide a barrier extending wholly or largely across the stream and to trap fish, lampreys, eels and the like as they go upstream; for example, for spawning. To accomplish that purpose it includes one or more traps and a trap-collecting device, a net barrier and a net curtain.

1 is a net which is provided with weights or anchors 2 adjacent its lower margin and is provided with floats 3 at or adjacent its upper margin. It is fastened or anchored to the shore or to a solid base as at 4.

Extending through and preferably fastened to the net 1 are one or more traps 5. These traps may be generally rounded in cross section and formed of slats or slat-like or rod-like members 5', as shown in Figure 1. At one end each trap is provided with an internally directed, truncated cone 6 which is open as at 7 into the interior of the trap. At the opposite end the trap is provided with a truncated cone 8 which communicates at its end 9 with a pipe or conduit 10. The conduit 10 extends as at 11 into a collecting member 12 which is box-like, as shown, and is supported by floats 13, 13. A hinged or removable lid 14 closes the collecting member 12 which may be fastened by cables or ropes 15 to an anchor 16 fixed on the shore. 12a is a screened opening.

The net 1 will ordinarily be of such size and proportion that its upper margin, at which the floats 3 are positioned, is below the surface of the stream. The surface of the stream is indicated generally in Figure 1 as at X.

A curtain 17 of net is supported by a cable 18 which spans the stream and is secured to posts 19, as at 20. The net curtain 17, as shown in Figures 1 and 2, extends downwardly below the upper surface of the first-mentioned net 1 and is preferably provided with weights 21, 21. These weights tend to hold the net in the position shown in full lines in Figure 1. It is clear that the net 1 and the net curtain 17 together form a complete barrier across the stream and prevent the movement of fish, eels, lampreys and the like up or down the stream. Such creatures will be caught in the net 1 or the net curtain 17 or will enter the traps 5. Should they enter the traps 5 they will either remain within them or work their way up along the conduit 10 to the collector surface 12. Experience has shown that this will occur and that the fish or lampreys will not return down the pipe 10 after they have once entered the collector or box 12.

The current in the stream is indicated by the arrow in Figure 1 and floating articles, such as logs, brush and debris, generally will be carried in the direction of the arrow with the current of the stream. Since such articles are normally carried at or close to the surface of the stream, the net 1 is ordinarily so proportioned and maintained that it does not reach to the surface of the stream. Its upper margin is substantially below the surface of the stream and is preferably sufficiently below that surface so that floating articles will clear it without contact, and, hence, without damage to it. The curtain 17, extending as it does well below the upper edge of the net 1, makes with it a complete net barrier.

Floating articles passing downwardly in the direction of the arrow of Figure 1, which is the direction of movement of the current, will, as stated, pass above the upper edge of the net 1 and will contact the curtain 17 somewhere above the upper edge of the net 1. Since the curtain 17 is suspended from above and is on the downstream side of the net 1, it may swing freely from the full line position of Figure 1 to or toward or beyond the dotted line position of that figure. When this occurs the floating articles will pass beyond the upper edge of the net 1 and may displace the curtain 17 and pass under it. After floating articles have passed downstream beyond the curtain 17, the curtain 17 is free to return to the full line position of Figure 1. The weights 21 tend to cause it to assume a vertical position in which it will be in contact with the net 1. Thus, in effect, the composite net structure formed by the net 1 and the curtain 17 is shaped to provide a door through which floating articles may move without destroying or damaging the net assembly, and, at the same time, as soon as the floating articles have disappeared the door will close automatically and will complete again the barrier to the passage of fish, eels, sea lampreys or other marine animals attempting to go upstream.

The upward passage of the fish, eels, and eel-like creatures is prevented by the composite net structure, and should they enter the traps, they will be merely caught, or caught and collected, in case they reach the collecting member 12.

The stream flows in the direction indicated by the arrow in Figure 1 and tends to enter the collecting member 12 and through the screened opening 12a. Thus, the collecting member is kept full of water to the appropriate level, and water flows from the collecting member through the pipes or conduits 10 to the traps 5. Thus, a downwardly flowing current of water is provided through the pipes 10, and an eel or lamprey, finding itself in a trap 5 and moving in the direction of the conduit, encounters a downwardly flowing current and by instinct moves upwardly against it through the conduit 10 and emerges into the collector 12.

Although I have shown an operative form of my invention, it will be recognized that many changes in the form, shape and arrangement of parts can be made without departing from the spirit of the invention, and my showing is, therefore, to be taken as, in a sense, diagrammatic.

I claim:

1. In combination, a main net, means for supporting said net in a body of water in a generally upright position with its upper margin below the surface of said body of water, and a second separate net member and means for supporting it in a generally upright position in said body of water with its lower margin below the upper margin of said first net, and with its upper margin above the upper margin of said first net.

2. In combination, a main net, means for supporting said net in a body of water in a generally upright position with its upper margin below the surface of said body of water, a second separate net member and means supporting it in a generally upright position in said body of water in overlapping relation with said first net and with its lower margin below the upper margin of said first net, and means for supporting said second net for independent swinging movement toward and away from said first net.

3. In combination in a net assembly, a main net, means for supporting said net in a body of water in a generally upright position with its upper margin below the surface of said body of water, and a second separate net member and means for supporting it in part in said body of water in a generally upright position adjacent and overlapping said main net with its lower margin below the upper margin of said first net, and its upper margin above the upper margin of said first net.

4. In combination in a net assembly, a main net, means for supporting said net in a body of water in a generally upright position with its upper margin below the surface of said body of water, a second net member, means supporting it in part in said body of water in a generally upright position adjacent and overlapping said main net with its lower margin below the upper margin of said first net, and its upper margin above the upper margin of said first net, and means supporting said second net for free swinging movement toward and away from said first net, and into and out of contact with said first net.

5. In combination in a net assembly, a plurality of separate nets, means for supporting one of said nets in a body of water with its upper margin substantially below the surface of said body of water, and separate means for supporting a second of said separate nets in part within said body of water and in part above said body of water, the lower margin of said second net being below the upper margin of said first net, and the upper margin of said second net being above the upper margin of said first net, the two nets together forming a composite separable net assembly from top to bottom of said body of water.

6. In combination in a fish trapping assembly, a net, means for supporting said net in a generally upright position with its top margin substantially below the surface of a stream, a plurality of traps positioned to present openings through said net, a cooperating separate net positioned to contact and to form a relatively movable continuation of said first mentioned net, and means supporting said second net for free swinging movement into and out of contact with said first net, said second net extending below the surface of said stream and below the upper margin of said first net.

7. In combination in a fish trapping assembly, a net, means for supporting said net in a generally upright position with its top margin below the surface of a stream, a plurality of traps positioned to present openings through said net, a fish collecting means supported at the surface of said stream, communication means from each trap to said collecting means, a cooperating separate net positioned to form a relatively movable continuation of said first mentioned net, and means supporting said second net independently of and in part above said stream for free swinging movement into and out of contact with said first net and said second net extending below the surface of said stream and below the upper margin of said first net.

8. In combination in a fish trapping assembly, a net, means for supporting said net in a generally vertical position with its bottom margin in contact with the bottom of a stream and with its top margin substantially below the surface of said stream, a plurality of traps positioned to present openings through said net, a fish collecting means supported at the surface of said stream, communication means from each trap to said collecting means, a cooperating separate net positioned generally upright to form a continuation of said first mentioned net, and means supporting said second net in part above said stream for free swinging movement into and out of contact with said first net and said net extending below the surface of said stream and below the top margin of said first net.

LOTHAR A. EDERER.

References Cited in the file of this patent

UNITED STATES PATENTS

| Number | Name | Date |
| --- | --- | --- |
| 194,434 | Howes | Aug. 21, 1877 |
| 326,139 | Moscopoulos | Sept. 15, 1885 |
| 454,026 | Brayton | June 16, 1891 |
| 557,611 | Ryall et al. | Apr. 7, 1896 |
| 1,554,894 | Stowe | Sept. 22, 1925 |
| 2,018,580 | Schonhoff et al. | Oct. 22, 1935 |

FOREIGN PATENTS

| Number | Country | Date |
| --- | --- | --- |
| 222,015 | France | May 16, 1882 |